Figure 1A:
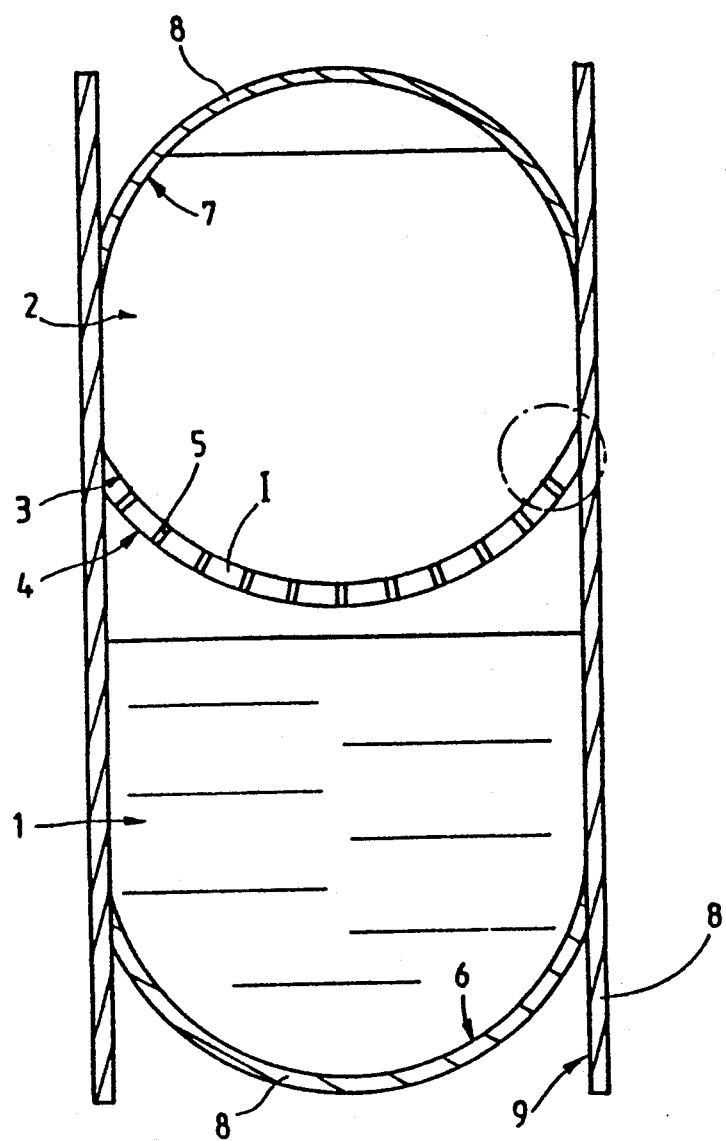

United States Patent [19]

Le Touche

[11] Patent Number: 5,018,634

[45] Date of Patent: May 28, 1991

[54] SUSPENDED SKIN FOR THERMAL INSULATION OF CRYOGENIC PROPELLANTS

[75] Inventor: Roger Le Touche, Ecquevilly, France

[73] Assignee: Aerospatiale Societe Nationale Industrielle, Paris, France

[21] Appl. No.: 581,614

[22] Filed: Sep. 12, 1990

[30] Foreign Application Priority Data

Sep. 12, 1989 [FR] France ................................ 89 11917

[51] Int. Cl.⁵ ............................................ B65D 25/00
[52] U.S. Cl. .................................. 220/4.12; 220/565; 220/4.15
[58] Field of Search ............... 220/565, 500, 901, 469, 220/4.12, 4.15

[56] References Cited

U.S. PATENT DOCUMENTS

| | | | |
|---|---|---|---|
| 2,995,268 | 8/1961 | Kurtovich | 220/901 X |
| 3,127,750 | 3/1964 | LaFave et al. | 220/901 X |
| 3,215,313 | 11/1965 | Stelts | 220/901 X |
| 3,680,323 | 8/1972 | Bognas et al. | 220/901 X |
| 3,713,560 | 1/1973 | Slysh et al. | 220/901 X |
| 3,756,024 | 9/1973 | Gay | 60/204 |
| 3,765,558 | 10/1973 | Withers | 220/901 X |

*Primary Examiner*—Steven M. Pollard
*Attorney, Agent, or Firm*—Browdy and Neimark

[57] ABSTRACT

The invention consists in a double storage tank with an upper storage tank disposed above a lower storage tank, the storage tanks being separated by a thermally insulative wall, in which said thermally insulative wall is a double-skin wall comprising a rigid bulkhead towards the upper storage tank and a skin towards the bottom storage tank which is permeable to gases but impermeable to the liquid in the bottom storage tank, said rigid bulkhead and said skin being held apart.

7 Claims, 1 Drawing Sheet

SUSPENDED SKIN FOR THERMAL INSULATION OF CRYOGENIC PROPELLANTS

The present invention concerns a wall forming thermal insulation for separating products.

In some fields where it is essential to superpose two storage tanks containing two different products it is also essential to maintain appropriate thermal insulation between said storage tanks if they contain products at temperatures such that any exchange of heat, however small, between the two products could lead to major difficulties caused in particular by a change in the physical state of one of the products such as the formation of crystals or vapour from an originally liquid product, resulting for example in the clogging of microbore pipes or a dangerous pressure rise.

It may also be essential for the two superposed storage tanks to have the minimum possible volume and weight.

Given these requirements, the conventional solution to this problem consists in separating two conventional storage tanks by means of a cylinder, the gas contained in the gap between the storage tanks does not providing the thermal insulation, is not fully convenient. The large volume of gas between the two storage tanks is not usable and is therefore wasted.

It is possible to insulate storage tanks by bonding to the common wall a polyurethane or polyisocyanate foam. However, if the products insulated from each other in this way are at cryogenic temperatures, for example at different temperatures below 100° K., this form of insulation is not acceptable as the foam soon cracks and becomes totally ineffective.

For this reason the object of this application is a double storage tank with an upper storage tank disposed above a lower storage tank, the storage tanks being separated by a thermally insulative wall, characterised in that said thermally insulative wall is a double-skin wall comprising a rigid bulkhead towards the top storage tank and a skin towards the bottom storage tank, said skin being permeable to gases but impermeable to the liquid in the bottom storage tank, said rigid bulkhead and said skin being held apart.

The expression "rigid bulkhead" means a substantially undeformable bulkhead with characteristics suited to use as the bottom of a storage tank. Its strength and the material from which it is made therefore depend on the quality and quantity of product that the storage tank holds.

Said bulkhead will usually be made of metal and, given the requirement to minimise the weight, from a strong light alloy. It could of course be made from some other material and/or specially treated, for example to contain an acid or some other corrosive product.

The expression "held apart" means that a space is formed between the skin and the rigid bulkhead; as the skin is permeable to gases, this space will be filled with a gas which could be of the same nature as the bottom tank liquid, for example gaseous hydrogen if the bottom tank contains liquid hydrogen.

The separation is preferably small to limit turbulence in the gas between the skin and the bulkhead. In the case of a 5 m diameter spherical storage tank, for example, the separation could be 10 to 20 mm. This separation may be maintained by any appropriate means and in particular by spacers.

If for a given overall volume the bottom storage tank must have a maximum capacity combined with sufficient insulation provided by the space between the bulkhead and the skin, the distance between the rigid bulkhead and the skin is kept constant over all the surface area of the double-skin wall.

The expression "kept constant" means that the distance between the bulkhead and the skin is substantially regular and therefore, for example, that the skin is substantially parallel to the bulkhead if the latter is flat.

With other preferred conditions for implementing the invention the skin has a coefficient of expansion or retraction similar to that of the rigid bulkhead. This characteristic makes it possible to reduce the stresses exerted on the skin and therefore to modify its weight, its thickness or its distance from the bulkhead.

When supports are used, especially spacers, the distance between the various supports may be calculated in relation to the characteristics of the skin and according to the stresses to which it will be subjected, for example rapid depressurisation of the bottom storage tank leading to an increase in the pressure of the gas between the skin and the bulkhead.

These supports are advantageously fixed to the bulkhead. They are also advantageously fixed to the skin.

They may be fixed by any known means and in particular by adhesive bonding.

The fixing method may be a combined method in the sense that the support may be adhesively bonded to the wall, for example, and the skin fixed to the support by rivets, screws, etc, or visa versa.

The fixing of the skin to the support may also be reinforced so that stresses in the skin are distributed in such a way as to avoid tearing at the fixings, for example.

The wall in accordance with the present invention may be flat. However, if the top storage tank is large it is advantageous for the rigid bulkhead to be substantially hemispherical. In this case the skin is on its convex side, in other words below said rigid bulkhead. A configuration of this kind is described later.

If the storage tanks must be large and/or very strong they are advantageously made from metal, preferably from light alloy, as is the rigid bulkhead of the wall in accordance with the invention.

The skin may be woven metal, for example, preferably the same metal as the rigid bulkhead if the latter is metal.

The woven metal is then treated with an appropriate product to give it some degree of impermeability to liquids whilst retaining its permeability to gases. The strength of the skin may be calculated according to the stresses it must withstand.

Woven glassfibre coated with PTFE may also be used, for example. Products of this kind that can be used for the skin include, for example, porous products marketed by the company Fothergill under the tradename TYGAVAC.

Figure 1B:
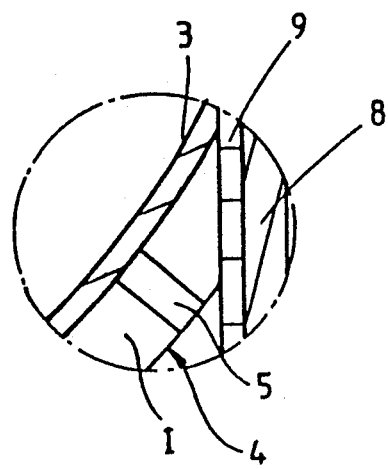

The present invention will be better understood on referring to the appended drawing in which:

FIGS. 1A and 1B show a wall in accordance with the present invention insulating two storage tanks from each other.

The bottom storage tank 1 contains the liquid and the storage tank 2 contains the liquid or solid product. The rigid bulkhead 3 is separated from the skin 4 by supports 5 to form a gap I which can fill with gas. The bottom bulkhead 6 of the bottom storage tank and the top bulkhead 7 of the top storage tank maybe insulated from the ambient air by polyurethane foam 8, for example. The side walls 9 are also provided with insulation 8.

The permeability of the skin to gases may be quantified, for example by measuring head loss or by measuring the speed of return to pressure equilibrium after rapid depressurisation.

Impermeability to liquids is difficult to quantify accurately by calculation alone: many parameters must be taken into account (weaving tolerance, wettability, shrinkage). The skin is preferably chosen on the basis of trials.

Trials could be carried out as follows: a tube originally open at both ends but with its bottom opening covered by the skin under test is dipped into the bottom liquid (liquid hydrogen, for example). By varying the mass of the tube, for example, it is possible to quantify accurately an impermeability force.

EXAMPLE OF USE OF THE INVENTION

Consider a cryogenic storage tank for liquid hydrogen and liquid oxygen with a common wall. The storage tank is made from aluminium alloy.

A suitable material for the skin is woven glassfibre coated with PTFE. This material has a coefficient of shrinkage which is very similar to that of the aluminium alloy used and the required porosity is easily achieved and controlled in industrial manufacture by known methods.

The mode of weaving and the PTFE coating must allow for:

the rate at which the liquid hydrogen storage tank is pressurised and depressurised;

its impermeability to liquid hydrogen.

The necessary impermeability force (weight per unit area) must be equal to or greater than the weight per unit area of the liquid above the woven material. In the configuration shown in the accompanying diagram the skin can only be wetted by splashes during filling or by displacement of the liquid during zero gravity flight, that is to say under weightless conditions. The impermeability force need therefore be merely greater than zero.

What is claimed is:

1. Double storage tank with an upper storage tank disposed above a lower storage tank, the storage tanks being separated by a thermally insulative wall, characterised in that said thermally insulative wall is a double-skin wall comprising a rigid bulkhead (3) towards the top storage tank and a skin (4) towards the bottom storage tank said skin being permeable to gases but impermeable to the liquid in the bottom storage tank, said rigid bulkhead (3) and said skin (4) being held apart.

2. Double storage tank according to claim 1 characterised in that the distance between the rigid bulkhead (3) and the skin (4) is small.

3. Double storage tank according to claim 1 characterised in that the bulkhead and the skin are held apart by spacers.

4. Double storage tank according to claim 1 characterised in that the distance between the rigid bulkhead (3) and the skin (4) is kept constant over all the surface area of the double-skin wall.

5. Double storage tank according to claim 1 characterised in that the skin (4) has a coefficient of expansion similar to that of the rigid bulkhead (3).

6. Double storage tank according to claim 1 characterised in that the supports are fixed by adhesive bonding for example to the bulkhead (3) and/or to the skin (4).

7. Double storage tank according to claim 1 characterised in that the rigid bulkhead (3) is hemispherical, the skin (4) being on its convex side.

* * * * *